United States Patent Office 2,821,536
Patented Jan. 28, 1958

2,821,536

PRODUCTION OF WETTING, EMULSIFYING AND WASHING AGENT

Hans Feichtinger, Duisburg-Beeck, and Hans Tummes, Duisburg-Meiderich, Germany, assignors to Ruhrchemie Aktiengesellschaft, Oberhausen-Holten, Germany, a corporation of Germany No Drawing. Application February 10, 1954
Serial No. 409,508

Claims priority, application Germany February 16, 1953

9 Claims. (Cl. 260—401)

This invention relates to improvements in the production of wetting, emulsifying, and washing agents.

Alkali salts of acyl amino sulfonic acids, such as the sodium salts, are known to be good washing and emulsifying agents. In the known processes for the production of compounds of this type pure amino sulfonic acids were always reacted with higher molecular weight fatty acid chlorides. Among the aliphatic amino sulfonic acids taurin or taurins substituted with nitrogen were exclusively used. No commercially satisfactory methods were, however, known for the production of higher aliphatic amino sulfonic acids from amine propane sulfonic acid upward. Further, in the known processes the recovery of the pure amino sulfonic acids is a relatively difficult and expensive operation.

One object of this invention is the production of acylated higher amino sulfonic acids, which does not require the isolation of the intermediately forming amino sulfonic acids. This, and still further objects, will become apparent from the following descriptions.

It has now been found that wetting, emulsifying and washing agents of versatile applicability in the textile and related industries may be obtained by sulfo-chlorinating mineral salts of aliphatic amines, hydrolyzing the sulfochlorination product formed, and reacting the aqueous solution obtained by the hydrolysis with a higher molecular weight fatty acid chloride under alkaline reaction conditions.

The starting mineral acid salts of the aliphatic amine in accordance with the invention has the general formula $$HClH_2NR$$

in which R is an alkyl radical containing 4–6 carbon atoms.

The starting mineral acid salt of the aliphatic amine is dissolved or dispersed in a solvent and sulfochlorinated with gaseous chlorine and sulfur dioxide. The sulfochlorination products obtained are as such or after previous purification hydrolyzed with water and/or steam and the aqueous solution obtained is reacted in an alkaline reaction with a higher molecular weight fatty acid chloride containing an aliphatic hydrocarbon radical having from 11–18 carbon atoms. The hydrolysis of the sulfo-chlorination products may be effected with superheated steam if desired. The alkaline reaction in the conversion with the fatty acid chloride is obtained in the known manner by the addition of an alkaline material.

The starting mineral acid salts of aliphatic amines which are particularly suitable in accordance with the invention include aliphatic primary amine hydrochlorides having 4–6 carbon atoms and aliphatic secondary amine hydrochlorides, which contain, in addition to an alkyl radical having from 1–3 carbon atoms, a longer alkyl radical having from 4–6 carbon atoms. Primary aliphatic amines having only 3 carbon atoms in a chain are only of poor applicability for the process of the invention since considerably longer sulfochlorination times and lower yields than with amines having 4–6 carbon atoms in a chain must be expected. Mixtures of amine hydrochlorides of this type are also suitable for the conversion.

The starting amine hydrochlorides may be produced from amines prior to the subsequent sulfo-chlorination in the same vessel by passing hydrogen chloride into the corresponding amine solution. The solvents which may be used for this purpose include all of the liquids which are suited for carrying out sulfo-chlorination and particularly chloroform and carbon tetrachloride. The quantitative proportion of chlorine and sulfur dioxide required for the sulfo-chlorination may range as high as 1:3. The preferred ratio, however, is 1:1.3. The reaction temperature for the sulfo-chlorination may range between 10 and 65° C.

The sulfo-chlorination always results to a small extent in the formation of products which are only chlorinated and not sulfo-chlorinated. For this reason, after the sulfo-chlorination, the reaction product separated in solid form is preferably freed from those products which are only chlorinated and not sulfo-chlorinated by treatment with chloroform. If chloroform is initially used as the solvent for the sulfo-chlorination in sufficient quantities, then the subsequent separation operation is not necessary.

The hydrolysis of the sulfo-chlorination product is effected with water and/or steam at temperatures ranging from 80–250° C., and preferably between 100 and 150° C. in an open reaction vessel in order to permit complete and easy removal of the hydrochloric acid liberated. The duration of the hydrolysis treatment depends upon the temperature at which the same is effected. For example, the time required at 100° C. is about 1–3 hours. With higher temperatures, the hydrolysis proceeds at a correspondingly increased rate.

The hydrolysis results in the formation of an aqueous solution. In accordance with the invention this aqueous solution is directly used for the reaction with the high-molecular fatty acid chlorides. For this purpose, the resulting aqueous solution is mixed with sufficient caustic soda solution to have available one equivalent of free caustic soda solution per equivalent of sulfur-containing material. The concentration of the solution may vary within wide limits.

The conversion with the higher molecular fatty acid chlorides proceeds in the manner of the Schotten-Baumann reaction at temperatures of 0–40° C., and preferably 5–20° C., while vigorously stirring or shaking, and simultaneously adding equivalent amounts of fatty acid chloride and sodium hydroxide. The sodium hydroxide is preferably added in a 1-molal aqueous solution, but more dilute or concentrated solutions may also be used.

Suitable fatty acid chlorides include saturated and unsaturated aliphatic carboxylic acid chlorides having 11–18 carbon atoms. The conversion may with particular advantage be effectd with oleic acid chloride, stearic acid chloride, and palmitic acid chloride.

The end product by the alkaline reaction with the higher molecular weight fatty acid chloride is in the form of a viscous solution or jelly- or paste-like mass. The same may be used in this form or, after previous drying, in the form of powder for washing, wetting, and emulsifying purposes in the textile industry and in other fields. These wetting, emulsifying and washing agents will be generically referred to as surface-active agents in the claims.

The surface-active materials thus obtained are mixtures of organic compounds. By sulfo-chlorination of n-butylamine hydrochloride there is obtained, after saponification, 1-aminobutane-sulfonic-(3) acid and 4-aminobutane sulfonic-(1) acid. The conversion with oleic acid chloride according to Schotten-Baumann correspondingly results in a fatty acid condensation product which consists of the sodium salts of N-oleyl-1-aminobutane sulfonic-(3) acid and N-oleyl-4-aminobutane sulfonic-(1) acid. Analogously, sulfo-chlorination and saponification of n-pentylamine hydrochloride and conversion with palmitic acid chloride results in the sodium salt of N-palmitoyl-1-aminopentane sulfonic-(x) acid. The position of the sulfo group in this mixture is still unknown similar to the conversion product of n-hexylamine hydrochloride which consists of the sodium salt of N-palmitoyl-1-aminohexane sulfonic-(x) acid. Similarly, other fatty acid chlorides having 11–18 carbon atoms may also be added to the amino sulfonic acid mixtures obtained by the method in accordance with the invention. It was possible in all cases to isolate from the jelly- or paste-like mass the 100% condensates and to prove the composition thereof. For commercial use, the raw products obtained are quite sufficient.

As was mentioned already, amines other than those mentioned in the examples may also be converted by the process of the invention. Thus, it is possible, for example, to process amines which, in addition to a carbon atom chain with 4–6 carbon atoms, contain shorter side chains. Examples of such amines are dimethyl-butyl-amine, methyl-butylamine, diethyl-butylamine, ethyl-butyl-amine, methylethyl-butylamine, dimethyl-pentylamine, diethyl-pentylamine, methyl-ethyl-pentylamine, methyl-pentylamine, etc.

The following examples are given by way of illustration and not limitation.

Example 1

Gaseous chlorine and sulfur dioxide in a ratio of 1:1.3 were passed into a solution of 110 grams n-butylamine hydrochloride in 750 cc. alcohol-free chloroform. The reaction was effected in a tubular glass apparatus provided with stirrer, reflux condenser, gas inlet pipe and drain cock, while irradiating with a mercury vapor lamp and stirring, and while maintaining the temperature at about 40–50° C. After 5 to 10 hours, the crystallized sulfo-chlorination product formed was suction-filtered on a glass filter plate and washed several times with pure chloroform.

The sulfo-chlorination product, after treatment with a dry air stream, was then placed into a glass flask and heated for 3 hours with 250 cc. of water with reflux.

The aqueous solution was neutralized with dilute caustic soda lye against phenolphthalein and then, after the addition of a solution which contained 23 grams NaOH, water was added to a total volume of 600 cc. The solution was cooled to 5° C. Thereafter, 170 grams oleic acid chloride and 60 cc. 1-normal caustic soda solution, while stirring, were simultaneously added in such a manner that the solution always remained alkaline. The reaction mixture was then stirred for an additional 3–4 hours at room temperature. The excess caustic soda solution was neutralized, resulting in a jelly-like mass, which was soluble in water, and in particular suited for emulsifying various materials. By evaporation and drying under vacuum, the reaction product could be converted into a soap-like mass, the aqueous solutions of which showed higher foaming, wetting, and washing powers. These solutions were completely insensitive to alkaline earths and acids.

The active compound contained in the raw product was a mixture of the sodium salts of N-oleyl-1-aminobutane-sulfonic-(3) acid and of N-oleyl-4-aminobutane-sulfonic-(1) acid which have the following formulae:

$CH_3(CH_2)_7CH=$
 $CH(CH_2)_7CONHCH_2CH_2CH_2CH_2SO_3Na$
and
$CH_3(CH_2)_7CH=CH(CH_2)_7CONHCH_2CH_2CH_2CH_3$

Example 2

A dispersion of 43 grams n-pentylamine hydrochloride in 300 cc. carbon tetrachloride was sulfo-chlorinated, in the manner described in Example 1, with chlorine and sulfur dioxide, while irradiating. The molar ratio of chlorine to sulfur dioxide was 1:1.3; the reaction temperature was maintained at 50–60° C. With a flow velocity of the chlorine of 2.64 liters per hour, the reaction was terminated within four to five hours.

The crystal slurry obtained was suction-filtered and exhaustively extracted several times with alcohol-free chloroform. The non-extracted residue was dissolved in 35 cc. of water, and steam at 135° C. was passed through the solution for half an hour, thereby concentrating the solution to form a viscous liquid. After neutralization with dilute caustic soda solution, 6.5 grams dissolved sodium hydroxide were added and the solution was made up with water to 160 cc. The solution was cooled to 10° C. Then 45 grams palmitic acid chloride and 160 cc. 1-normal caustic soda solution were simultaneously added while stirring. After the addition, the stirring was continued for 3 hours at room temperature. Thereafter, the excess caustic soda solution was neutralized and the precipitate formed was sucked off. The reaction product obtained was soluble in hot water and highly foaming, and had good washing properties.

For further purification, the white raw product was recrystallized from hot alcohol. After drying, the product was obtained as a dust-like, snow-white, non-hygroscopic powder. The composition almost completely corresponded to the formula $CH_3(CH_2)_{14}CONHC_5H_{10}SO_3Na$

Example 3

A dispersion of n-hexylamine hydrochloride which had been produced by passing hydrogen chloride into a mixture of 30 grams n-hexylamine and 300 cc. carbon tetrachloride, was sulfo-chlorinated in accordance with Example 1. The semi-solid sulfo-chlorination product was separated from carbon tetrachloride. It was mixed with 70 cc. of water and heated for 3 hours under reflux. The aqueous solution was alkalized with caustic soda solution, and then the non-sulfonated amines were driven off by means of superheated steam at 130° C. The remaining reaction solution was mixed with 10 grams sodium hydroxide and made up with water to give a liquid volume of 250 cc. After cooling to 10° C., the solution was reacted in the known manner with 75 grams oleic acid chloride and 250 cc. 1-normal caustic soda solution. After neutralization with hydrochloric acid, a jelly-like mass was obtained as the reaction product which was soluble in water and showed very good washing properties even in the presence of alkaline earths and acids.

The washing-active substances contained in the raw product were the sodium salts of N-oleyl-1-aminohexane-sulfonic-(x) acids having the formula $CH_3(CH_2)_7CH=CH(CH_2)_7CONHC_6H_{12}SO_3Na$ By evaporation on flat glass dishes, the product could be converted into a colorless powder which was as fine as dust and had the same washing properties as the viscous raw product.

Example 4

A solution of n-butylamine hydrochloride which had been prepared by passing hydrogen chloride into a mixture of 30 grams n-butylamine and 300 cc. chloroform, was sulfo-chlorinated in the manner described in Example 1. The sulfo-chlorination product was hydrolyzed with superheated steam at 135° C. The sirupy residue was neutralized with caustic soda solution, mixed with a solution containing 9.5 grams NaOH and made up with water to a volume of 250 cc. The solution, after cooling to 5° C., was mixed, while stirring, with 60 grams myristic acid chloride and 250 cc. 1-normal caustic soda solution in such a manner that the reaction solution was always alkaline. After stirring for three hours at room temperature, the viscous solution was neutralized with hydrochloric acid and evaporated to dryness. The pulverulent product obtained was water-soluble and had very good foaming and washing properties. The compounds contained in the raw product were the sodium salts of N-myristoyl-1-aminobutane sulfonic-(3) acid and N-myristoyl-4-aminobutane sulfonic-(1) acid having the formulae:

$$CH_3(CH_2)_{12}CONHCH_2CH_2CH(SO_3Na)CH_3$$

and $$CH_3(CH_2)_{12}CONHCH_2CH_2CH_2CH_3$$

Example 5

A solution of 45 grams n-butylamine hydrochloride in 300 cc. chloroform was sulfo-chlorinated in accordance with Example 1. The sulfo-chlorination product was hydrolyzed with water and hot steam at 120° C. The resulting aqueous solution was neutralized with dilute caustic soda solution. After the addition of 10 grams dissolved sodium hydroxide, the solution was made up with water to a volume of 250 cc. Thereafter, the solution was reacted in the known manner with fatty acid chloride of tallow and 250 cc. 1-normal caustic soda solution. The viscous liquid thereby formed was neutralized with hydrochloric acid resulting in a viscous, milky liquid with good foaming and washing properties.

Example 6

A dispersion of 45 grams n-hexylamine hydrochloride in 300 cc. carbon tetrachloride was sulfo-chlorinated in accordance with Example 1. The semi-solid sulfo-chlorination product was seperated from carbon tetrachloride and heated with 70 cc. of water for 3 hours under reflux. The aqueous solution obtained was alkalized with caustic soda solution. The non-sulfonated amines were driven off by means of superheated steam at 130° C. The remaining reaction solution was made up with caustic soda solution and water to give a liquid volume of 250 cc. which contained 40 grams/liter of NaOH. After cooling to 10° C., the solution was reacted in the known manner with 50 grams undecylenic acid and 250 cc. normal caustic soda solution resulting in a slightly viscous liquid which, by evaporation of the water, was converted into a colorless solid product. By recrystallization from alcohol, it could be freed from admixed sodium chloride. Its composition corresponded to the formula $$CH_2=CH(CH_2)_8CONHC_6H_{12}SO_3Na$$

i. e. to the sodium salts of N-undecenoyl-1-aminohexane sulfonic-(x) acids.

We claim:

1. Process for the production of wetting, emulsifying, and washing agents of the general formula $$RCO-NHC_nH_{2n}SO_3Na$$

in which R is a member of the group consisting of saturated and unsaturated aliphatic alkyl radicals containing from 11-18 carbon atoms, and $n$ is one of the numbers from 4 to 6, which comprises sulfo-chlorinating hydrochloric acid salts of amines of the general formula $HClH_2NC_nH_{2n+1}$ in which $n$ is one of the numbers from 4 to 6, with gaseous chlorine and sulfur dioxide in the presence of a solvent, hydrolyzing the sulfo-chlorination product formed with water, thereafter contacting the aqueous solution formed by the hydrolysis with a fatty acid chloride containing an aliphatic hydrocarbon radical with 11–18 carbon atoms in the presence of sodium hydroxide under alkaline reaction conditions and recovering the reaction product formed.

2. Process according to claim 1, in which said fatty acid chloride is selected from the group consisting of oleic acid chloride, stearic acid chloride and palmitic acid chloride.

3. Process according to claim 1, in which said solvent is a member selected from the group consisting of chloroform and carbon tetrachloride.

4. Process according to claim 1, in which said sulfochlorination is effected at a temperature of about 10–65° C.

5. Process according to claim 4, in which said sulfochlorination is effected with gaseous chlorine and sulfur dioxide in the ratio of 1:1.3.

6. Process according to claim 1, in which the sulfochlorinated products obtained by the sulfur chlorination are purified by washing with chloroform prior to said hydrolyzing.

7. Process according to claim 1, in which said hydrolyzing is effected at a temperature of about 80–250° C.

8. Process according to claim 1, in which an aqueous solution of sodium hydroxide is added to the aqueous solution formed by the hydrolyzing and directly thereafter said contacting with the fatty acid chloride is effected.

9. Process according to claim 1, in which said contacting with said fatty acid chloride under alkaline reaction conditions is effected by adding equivalent amounts of the fatty acid chloride and sodium hydroxide with agitation.

References Cited in the file of this patent

UNITED STATES PATENTS

| | | |
|---|---|---|
| 1,932,177 | Guenther et al. | Oct. 24, 1933 |
| 1,932,180 | Guenther et al. | Oct. 24, 1933 |
| 2,651,645 | Cross | Sept. 8, 1953 |

FOREIGN PATENTS

| | | |
|---|---|---|
| 633,334 | Germany | July 2, 1936 |

OTHER REFERENCES

Schwartz and Perry, Surface Active Agents, 1949, pages 40, 75, 88.

"Organic Chemistry," by Fieser and Fieser. Copyright 1950, second edition, pages 44–45.